United States Patent [19]
Borgardt

[11] 3,914,841
[45] Oct. 28, 1975

[54] ADJUSTING DEVICE FOR A CUTTING TOOL

[75] Inventor: Rolf Hilding Borgardt, Sandviken, Sweden

[73] Assignee: Sandvik Aktiebolag, Sandviken, Sweden

[22] Filed: Aug. 15, 1974

[21] Appl. No.: 497,737

[30] Foreign Application Priority Data
Aug. 30, 1973  Sweden .............................. 7311773

[52] U.S. Cl. ........................ 29/98; 29/96; 29/105 R
[51] Int. Cl.² ............................................ B26D 1/00
[58] Field of Search ...................... 29/98, 96, 105 R

[56] References Cited
UNITED STATES PATENTS
2,962,800   12/1960   Swenson ................................. 29/98
3,102,441   9/1963   Milewski ............................. 29/98 X FOREIGN PATENTS OR APPLICATIONS
989,133   4/1965   United Kingdom ..................... 29/96

*Primary Examiner*—Leonidas Vlachos
*Attorney, Agent, or Firm*—Pierce, Scheffler & Parker

[57]   ABSTRACT

The present tool holder, for use in adjustably supporting a cutting tool, makes use of the same element and slide-face both for adjusting the holder in a first direction and for adjusting the holder in a direction perpendicularly oriented thereto. One support surface abuts against a cylindrical surface whilst another support surface abuts against a movable adjusting-supporting member in the tool body.

8 Claims, 4 Drawing Figures

ADJUSTING DEVICE FOR A CUTTING TOOL

The present invention relates to the cutting tool art and is concerned with an adjusting device for a tool holder associated with a cutting tool, said holder being clampable to the tool body by means of a locking screw.

Various wedge adjusting devices for cutting tools already exist which, mounted in a milling cutter, do provide for insert adjustment radially with respect to the axis of rotation of the cutter. Use of wedge arrangements with such devices, however, provides for accurate adjustment in one direction only. In milling cutters of small breadth, intended for slotting functions, there is a requirement that the insert be adjustable appreciably in one direction while also being adjustable in a direction perpendicular thereto. In connection therewith a wedge arrangement comprising double wedges must be excluded from considerations of space. Also with rotary cutters other than those for slotting functions there is a need for a simple adjusting device providing fine adjustment of the insert axially of the tool body. Another requirement is that such devices should provide for a good accessibility.

It is an object of the invention to provide a simple as well as effective solution of the above-related problems in cutting tools. An essential characterizing feature of the invention is that one and the same element and slide-face is used both for adjusting the toolholder in one direction as well as for adjusting it in a direction perpendicularly orientated thereto, thus providing fine adjustment of the insert in both said directions. The invention is more particularly characterized in that the toolholder is arranged at one support surface for abutment against a cylindrical surface whilst at another supporting surface abutting against a movable adjusting and supporting member provided in the tool body, said last-mentioned member providing for pivoting of said tool holder around said cylindrical surface upon varying the positioning of said member. The said cylindrical surface preferably is formed by a separate roller provided between the holder and its site in the tool body.

The invention will now be described more specifically below, with reference to the accompanying drawing showing one embodiment of the invention, in which FIG. 1 is a sectional view of an adjusting device according to the invention;

Figure 1:
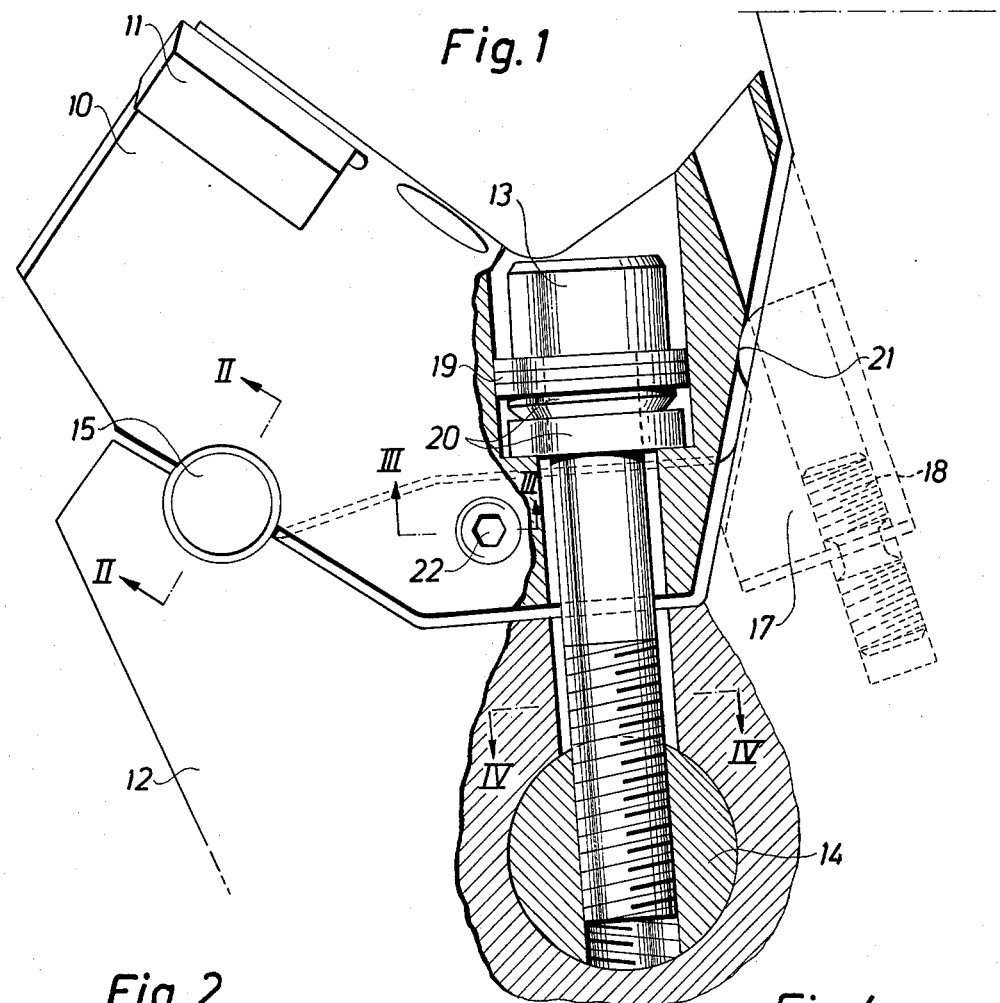
Figure 2:
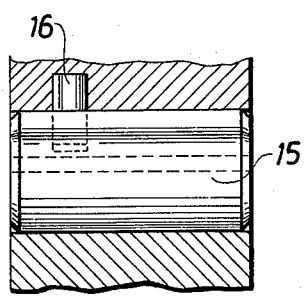
FIG. 2 is a section, taken on line II — II in FIG. 1.

Referring to FIG. 1, a toolholder 10 is formed with a site to receive a cutting insert 11. The toolholder 10 is clamped to the periphery of a rotary milling cutter body 12 by means of a locking screw 13 received in said holder, said screw 13 being threadably engaged with a cylindrical swivelling nut 14 received in the cutter body. The holder 10 is at one support surface arranged to abut against a cylindrically arcuated surface formed by a cylindrical roller 15 disposed for rotational movement between the holder and the cutter body. Alternatively said separate roller 15 may be excluded, the holder then being of cylindrical convex shape at said support surface arranged to abut against a complementary arcuate recess of cylindrical shape formed directly in the cutter body. The roller 15 is prevented from axially sliding apart from both cutter and holder bodies simultaneously by arrangement of a resilient pin 16 or similar partially received in either of said bodies.

The holder is at another support surface arranged to abut against a movable adjusting and supporting member 17 formed by a wedge, an excenter or the like. This member 17 is to be manipulated and secured to the cutter body in a suitable manner; with this embodiment the manipulation thereof is effected by means of a double threaded set-screw 18. The actuation by turning of set-screw 18 will, via member 17, cause pivoting of holder 10 in cooperation with cylindrical roller 15. In connection with this turning it is to be understood that a sufficient gap must be provided between the screw 13 and its corresponding bore in the cutter body so as to enable said holder 10 and screw 13 to pivot generally without bending of the screw 13.

Adjustment of the insert and the holder radially is effected by first slightly loosening set-screw 13. For the purpose of biasing the holder 10 towards the supporting member 17 and cylindrical roller 15 spring elements formed by a number of spring washers 19 are disposed between the head of screw 13 and a pair of discs 20 associated therewith in the holder 10. Rotation of set-screw 18 of member 17 in a desired direction will then produce inward or outward movement, as see in FIG. 1, wherewith a surface 21 of member 17 acting as support surface is caused to slide on a facing slide surface on holder 10. This causes pivoting of said holder around roller 15 thus correspondingly varying the radial displacement of the insert 11 relative to the axis of the cutter. The mutually abutting sides of the discs 20 are spherical to provide for the screw 13 to take different angular positions relative to the holder 10.

Figure 3:
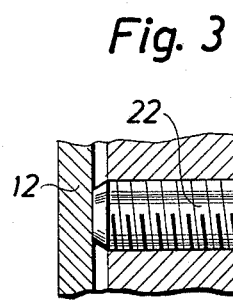
FIG. 3 is a section, taken on line III — III in FIG. 1.
Figure 4:
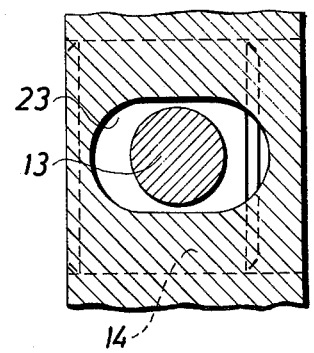
FIG. 4 is a section, taken on line IV — IV in FIG. 1.

Adjustment of the holder 10 axially of cutter body 12 is effected by turning another set-screw 22 in the holder which is substantially parallel to the roller 15 and slightly disengageable from said holder so as to provide for abutment against a fixed abutment surface in the cutter body thus displacing the holder axially of said screw 22. Due to said turning of screw 22 the holder is caused to slide axially of said cylindrical surface, provided on said roller 15, and said support surface 21, provided on said member 17. During said axial movement locking screw 13, swivelling nut 14, that is disposed substantially parallel to roller 15, and holder 10 are preferably arranged to slide as one assembled unit. For that purpose an elongated recess 23 is provided in cutter body 12, as shown in FIG. 3, so as to provide for free lateral movement of locking screw 13. It is to be understood, however, that such elongated recess could alternatively be provided in the holder 10, said holder then solely being subject to said adjusting movement.

After thus having brought the insert to a desired position the tightening of locking screw 13 causes fixation of the adjusted position.

From the foregoing it is clear that the adjustable cutting toolholder according to the invention is formed to provide an amplified degree of accuracy of adjustment both in one direction and in a direction perpendicular thereto. This is achieved by having one and the same slide-face on an element used for adjustment in both said directions. Another advantage is achieved from considerations of manufacture because the cylindrical bore adapted for reception of the cylindrical roller is easy to provide by means of a reaming tool. This arrangement also makes it easy to prevent the axis of said roller-receiving bore from taking an angular position relative to the axis of the cutter, thus providing for insert adjustment axially of said bore without affecting the adjusted radial position.

I claim:

1. A cutting tool comprising a tool body (12) having a site provided thereon to receive a holder (10), said holder being adapted to hold a cutting bit (11) at one extremity thereof, said site presenting a first abutment surface of cylindrical shape, arranged for abutment with a first support surface on said holder, said support surface being of complementary cylindrical shape, said site presenting a second abutment surface remote from said first abutment surface, for abutment with a second support surface on said holder, said second abutment surface being provided by adjusting means (17) threadably engaged with the tool body adjacent said site, said adjusting means being displaceable toward and away from said site upon actuation of screw means (18) for effecting pivotal movement of said holder relative to said cylindrical abutment surface, and holding means for retaining said holder in adjusted position on said tool body said holding means comprising a locking screw (13) extending through said holder between said support surfaces while threadably engaging with the tool body (12).

2. Device as defined in claim 1, in which the cylindrical surface is formed by a separate roller (15) provided between the holder and its site in the tool body.

3. Device as defined in claim 1, in which said first support surface of the holder is of cylindrical convex shape disposed for abutment against a complementary recess of cylindrical shape formed directly in the tool body.

4. Device as defined in claim 2, in which said roller (15) is disposed for rotational movement in the tool body.

5. Device as defined in claim 1, in which a surface (21) of member (17) acting as support surface is slidable on a facing surface on the holder (10) upon varying the positioning of said member.

6. Device as defined in claim 2, in which a swivelling nut (14) is provided in the tool body parallel to said roller (15) said nut being threadedly engaged with locking screw (13) so as to provide for said screw to take different angular positions upon pivoting movement of the holder around said roller (15).

7. Device as defined in claim 1, wherein said holder is provided with a set-screw (22) that is substantially parallel to said roller (15) and disengageable from said holder so as to provide for abutment against a fixed abutment surface on said tool body, thereby displacing the holder axially of said screw upon turning said screw.

8. Device as defined in claim 1, wherein spring elements (19) are associated with said locking screw (13) in the holder, for biasing said screw axially whereby urging said holder against support member (17) and roller (15) by spring action upon disengagement of said locking screw.

* * * * *